United States Patent Office 3,462,332
Patented Aug. 19, 1969

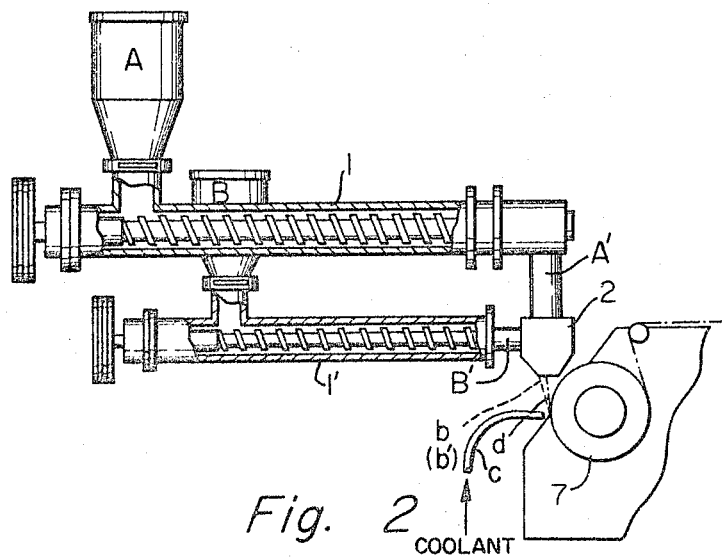
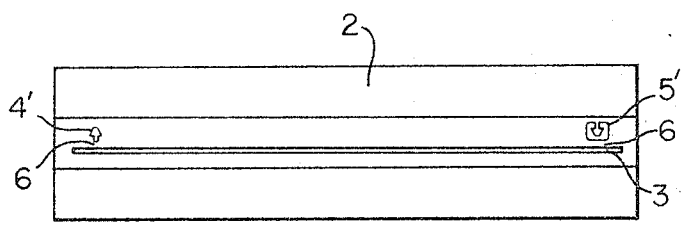
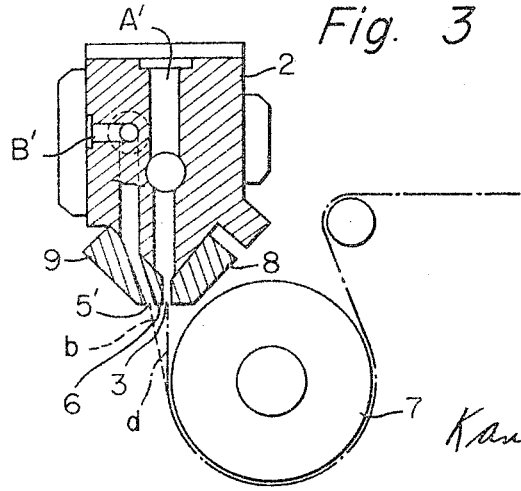

3,462,332
METHOD OF CONTINUOUSLY PROVIDING A FASTENER ON A THERMOPLASTIC FILM
Kanehiko Goto, Neyagawa-shi, Osaka-fu, Japan, assignor to High Polymer Chemical Industries, Ltd., Osaka, Japan
Filed Oct. 20, 1965, Ser. No. 498,558
Claims priority, application Japan, Mar. 5, 1965, 40/12,424
Int. Cl. B29c *19/04*
U.S. Cl. 156—244     7 Claims

ABSTRACT OF THE DISCLOSURE

A method of continuously forming a film having fastener members thereon. Concurrently with the extrusion of the film, there is extruded from separate die openings spaced from each other and from the film a pair of fastener members of thermoplastic synthetic resin. The film and the fastener members are brought together against the upper half of a rotating cooling roll while the film and fastening members are still in a fusible state, as well as effecting the forced cooling of the film and fastener members by applying a coolant onto said point of union. The manner of bringing the fastener members and film together is according to certain conditions relating to the angles between the film and fastening members, the extrusion dies and the members extruded therefrom and distance between the extrusion openings of the roll.

---

Figure 4:
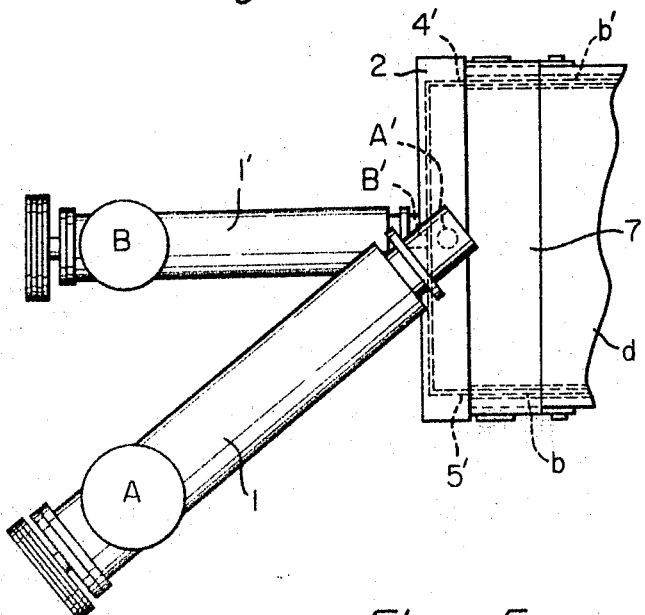

This invention relates to a method of continuously providing a fastener on a thermoplastic film. More particularly, the invention relates to a method wherein, in manufacturing a thermoplastic film bag having at its mouth a pair of male and female fastener members which can be opened and closed freely, as the starting material therefor a film is produced continuously provided in parallel on its one side with at least a pair of male and female fastener members.

Lately, frequent use is made of thermoplastic bags in which the contents thereof can be sealed by means of a freely openable and closeable opening by the provision at the mouth of the bag with a fastener of thermoplastic resin. Heretofore, in making this type of bag it has been the practice to produce the starting material therefor, the fastener-equipped thermoplastic film, by a method of extruding from a die the film and fastener in an integrated form. Alternatively, the foregoing material was made by a method in which the fastener in ribbon form and the film, which were both made in advance, were adhered as the demand arose.

However, the former method does not permit an optional change in the material, color and thickness of the film and fastener independently of each other. This is a drawback which cannot possibly be avoided so long as the method is one in which the film and fastener are extruded from a die in an integradated form. While the latter method is without this drawback, it possesses a different defect; namely, that its operating efficiency is low and also that the finish of the product is not good.

The object of the present invention resides in providing an improvement over these conventional methods. The foregoing object is achieved by a method wherein, in producing fastener-equipped synthetic resin films for making bags of this type by using as materials the film-forming thermoplastic resins as, for example, polyethylene (high, medium and low pressure processes), polypropylene, polystyrene, polyvinyl chloride (hard and soft), polyvinylidene chloride, cellulose acetate, polyesters such as polyethylene terephthalate, and polyamides such as polyhexamethylene tetramine, concurrently as a thin film of thermoplastic resin of optional width is formed by being continuously extruded from a die opening, into a space at one side of said film, at least a pair of fastener members of thermoplastic resin are extruded from a separate die opening by means of a separate extruding setup, and thereafter the extruded film and fastener members are brought together in the neighborhood of the upper half surface of a rotating cooling roll (that part of the rotating surface of a cooling roll positioned above a horizontal plane passing through the axis of said roll) disposed externally of the two die openings, while they are still in a fusible state. In this case, it is preferred that the relative positions of the film die opening and the fastener member die openings to the cooling roll, as well as the take-up angle of the film and fastener members be controlled so as to satisfy all of the following five conditions:

(a) $-45$ degrees $\leq \alpha \leq 45$ degrees;
(b) $-92$ degrees $< \gamma < 90$ degrees;
(c) $\delta \leq 45$ degrees;
(d) 30 mm. $\leq l \leq$ 300 mm., preferably 50 mm. $\leq l \leq$ 150 mm.; and
(e) 30 mm. $\leq l' \leq$ 300 mm., preferably 50 mm. $\leq l' \leq$ 150 mm.;

wherein $l$ is the rectilineal distance between the tip of the film die opening and the point of contact of the film with the cooling roll; $\alpha$ is the angle formed by the straight line along which said rectilineal distance $l$ is measured and a straight line extending from the film die opening; $l'$ is the rectilineal distance between the tip of the fastener member die openings and the point of union of the fastener members and the film; $\gamma$ is the angle formed by the straight line along which said rectilineal distance $l'$ is measured and a straight line extending from the fastener member die openings; and $\delta$ is the angle formed at the point of union of the film and the fastener members, i.e., an angle formed by the straight lines $l$ and $l'$.

In the case the tip of the film die opening and that of the fastener member die openings are in proximate positions, and a straight line extending from the film die opening points in a perpendicular or nearly perpendicular direction, the aforesaid lengths $l$ and $l'$ are substantially equal and the angle $\delta$ is very small, still better results are attained by operating within the scope of the aforesaid five conditions under the following three conditions, namely:

(1) 0 degree $< \alpha <$ 45 degrees;
(2) 30 mm. $\leq l \leq$ 300 mm.; and
(3) $\beta \leq 45$ degrees wherein $\beta$ is the intersecting angle formed by a straight line extending from the film die opening and a straight line extending from the fastener member die openings.

Further, preferably the point of union may also be forced cooled from the outside by means of a coolant in addition to the cooling by means of the foregoing roll.

Figure 5:
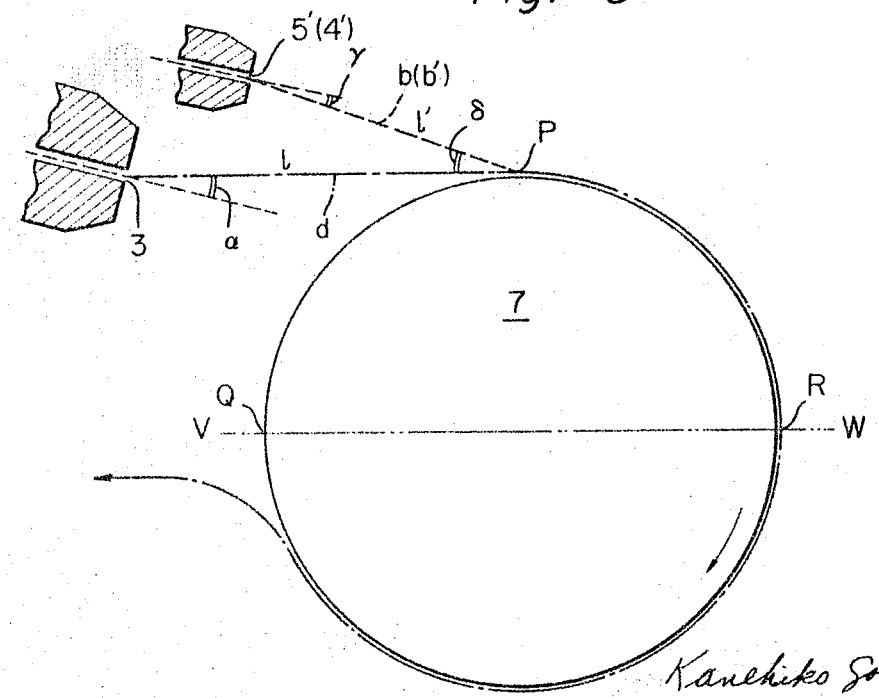
Figure 6:
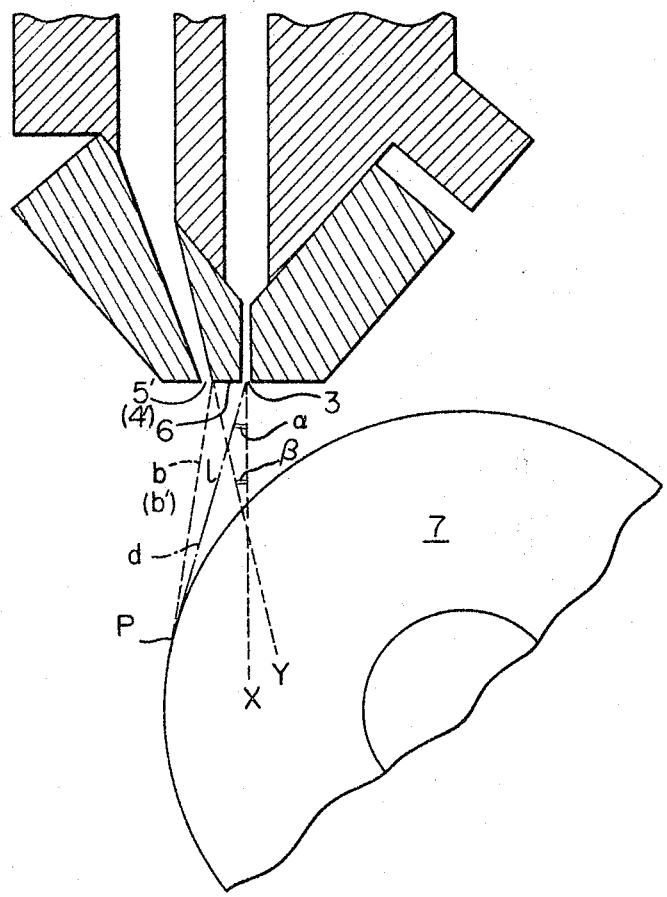
Figure 7A:
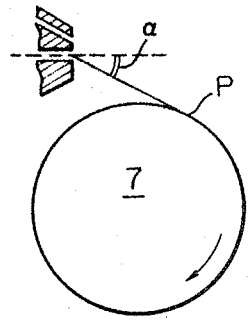
Figure 7B:
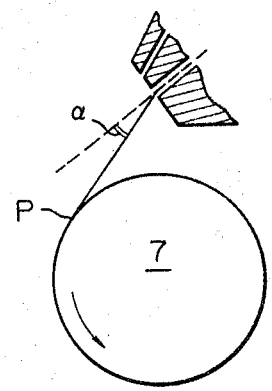
Figure 7C:
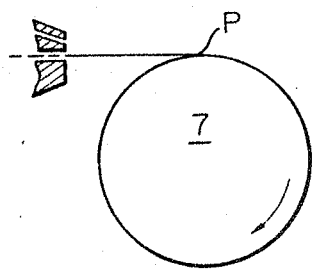
Figure 7D:
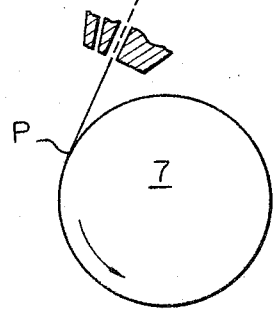
Figure 7E:
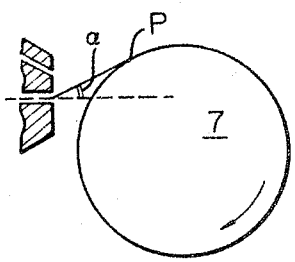
Figure 7F:
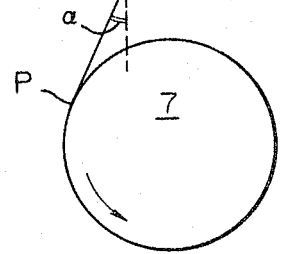
Figure 8A:
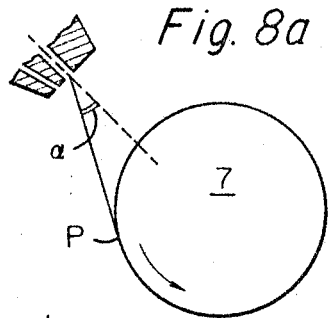
Figure 8B:
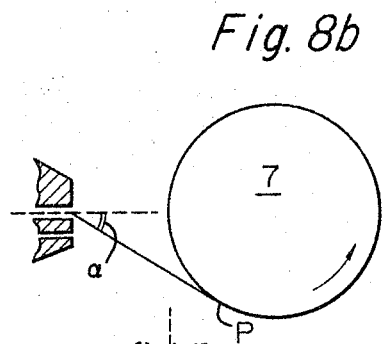
Figure 8C:
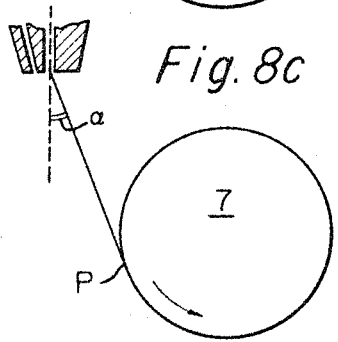
Figure 8D:
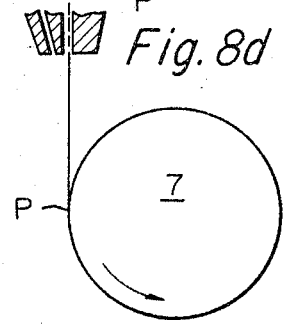
Figure 8E:
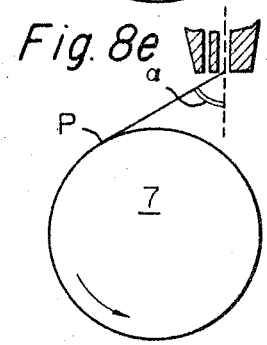
Figure 8F:
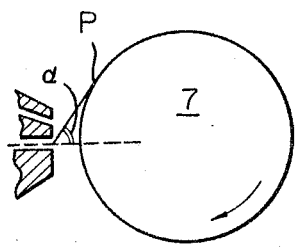
Figure 8G:
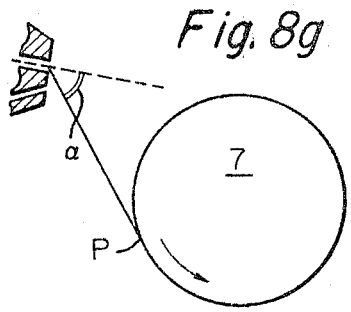

A mode of practicing the invention wherein a preferred apparatus is used will be described with reference to the accompanying drawings, wherein:

FIG. 1 is a side elevation partly broken away of the apparatus as a whole. FIG. 2 is a front view of the extrusion die. FIGS. 3 and 4 are respectively a side view in section and a plan view illustrating the molding operation. FIGS. 5 and 6 are side views in section showing the relative positions of the die openings of the extrusion die and cooling roll of two embodiments. FIGS. 7a–7f are diagrammatic views illustrating several other embodiments of the relative positions of the foregoing die openings and cooling roll. FIGS. 8a–8g are diagrammatic views illustrating several instances where these relative positions depart from that of the present invention.

The apparatus illustrated in the accompanying drawings comprises (I) a die provided with a passage for the molten thermoplastic resin for forming the film (hereinafter referred to as the No. 1 passage), and a passage for the molten thermoplastic resin for forming the fastener members (hereinafter referred to as the No. 2 passage), (II) a screw conveyor for the molten thermoplastic resin, communicating with the entrance to the No. 1 passage of the die, (III) a screw conveyor for the molten thermoplastic resin, communicating with the entrance to the No. 2 passage, (IV) a block which is provided with at least a pair of mold holes for forming the fastener members, communicating with the outlet of the No. 2 passage, (V) a separate block which is attached to the die facing the hereinabove mentioned block in spaced relation as to form a very long and narrow gap, thereby forming between it and the foregoing block a slit communicating with the outlet of the No. 1 passage of the die. (The aforesaid mold holes being provided so as to open outwardly at points separated from the aforesaid slit opening and inwardly from the ends of said slit), and (VI) a cooling roll located externally of said mold holes and slit so as to satisfy the hereinbefore stated conditions (a)–(e) or (1)–(3). Preferably, a means for applying a coolant against the surface of the cooling roll for carrying out the forced cooling thereof is provided.

In FIG. 3, 2 is the die and 8 and 9 are the blocks which have been installed by suitable means. A' is the No. 1 passage, while B' is the No. 2 passage. In the block 9 are provided a pair of mold holes (not apparent from the figure) which communicate with the outlet of the No. 2 passage B' (the bottom part in the figure). Between one of the faces of blocks 8 and 9, respectively, a slit 3 is formed, which communicates with the outlet of the No. 1 passage A' (the bottom part in the figure). As shown in FIG. 2, the openings 5' (female) and 4' (male), respectively, of the aforesaid pair of mold holes are separated from the opening of the slit 3 by means of a thin portion 6 and open outwardly from the block 9 at points inwardly from the ends of the slit (i.e., the distance between 4' and 5' is shorter than the distance between the ends of the slit). While the distance separating the opening 3 of the slit from the openings 4' and 5' of the mold holes (i.e. the thickness of the thin portion 6) will vary depending upon such molding conditions as the class of the starting material resin, the extrusion temperature and speed, and the take-up angle; it is normally 0.1–10 mm., and preferably 0.5–3 mm. Shim materials of thickness in accordance with the desired slit gap are inserted between the blocks 8 and 9. Thus the limitation of the thickness and width of the slit is achieved.

At the entrance to the No. 1 passage A' (the upper end in the figure) and the entrance to the No. 2 passage B' (the left side of the figure), there are coupled respectively a heater-equipped screw conveyor 1 and a hopper A and a heater-equipped screw conveyor 1' and a hopper B, as shown in FIG. 1. From the screw conveyor 1 a molten thermoplastic resin for forming the film is extruded via the No. 1 passage A' and the slit opening 3 as a film $d$. On the other hand, the thermoplastic resin for forming the fastener members is divided in two directions (the top and bottom directions in the figure) by means of the No. 2 passage B' in the die, as shown in FIG. 4, and then extruded from the openings 4' and 5' as male fastener counterpart $b'$ and female fastener counterpart $b$, respectively. The freshly extruded and still fusible fastener members and the foregoing freshly extruded and still fusible film are brought together at the outside of the apparatus. The union of the fastener members and the film is carried out at the point where the film comes into contact with the cooling roll 7 or in the neighborhood thereof, preferably 0–5 mm. ahead of, with respect to the direction of movement of the extruded sheet and fastener parts, said point, the cooling as well as the fusing together of the film and the fastener members being then completed here. The cooling roll 7 not only is so constructed as to pass cooling water through the interior thereof but is also disposed in such a fashion as to be capable of being adjusted as to its position vertically as well as laterally within a range whereby the aforementioned conditions (a)–(e) or (1)–(3) can be satisfied. It is also preferable to provide means C for force cooling the juncture of the film and the fastener members by spraying or blowing a coolant, say, water or cold air onto the surface of the cooling roll 7 in the neighborhood of aforementioned point where the fastener members and the film come together. This forced cooling has the effect of improving the decline in strength that occurs at the juncture of the film and the fastener member in those cases where the film is thin. After being cooled by the cooling roll and coolant, the material for making bags having a pair of fastener members continuously provided in parallel on a film a pair of fastener is wound up to be stored via a drying step.

Since, in accordance with the present invention, the molten thermoplastic resin for forming the film and the molten thermoplastic resin for forming the fastener members are extruded by separate extruding setups, resins differing with respect to their chemical and physical properties can be used for the two resins. Further, it is also possible to use resins having a different color. In addition, since the slit and fastener mold holes, as hereinabove described, not only have been formed by means of the two blocks 8 and 9 which are detachable from the die 2, but also the mold hole block 9 has been made separate so as to permit this part having the mold holes 4' and 5' detachable from the other parts, the configuration of the mold holes, the distance between the mold hole openings and the slit, the distance between the mold hole openings, and the magnitude of the slit gap are changeable. Hence, materials for bags of varying modes can be produced as desired. These points are advantages that cannot be realized by the prior art method using the type of apparatus which extrudes the film and fastener integrally. Further, when compared with the method in which the fastener, which has been formed separately from the film, is adhered to the film by means of adhesives, the invention method excels in such points as its expeditiousness and economy. Furthermore, as a result of the fact that according to the invention, as hereinbefore stated, the critical conditions such as (a)–(e) or (1)–(3) with respect to the relative positions between the die openings and the cooling roll must be satisfied, the film and the fastener members are fused together in a very satisfactory manner from the standpoint of the strength and finish of the product. While an apparatus wherein the slit 3 of the film die opening and the slits 4', 5' of the fastener member die openings were in proximate positions was previously described and illustrated, it is not necessarily required to position these close together. So long as the aforesaid conditions relative to $\alpha$, $\beta$, $\gamma$, $l$ and $l'$ are satisfied and the union of the film $d$ maintained in a fused state and the fastener members $b$, $b'$ is carried out at the upper half surface of the cooling roll 7, the relative positions of the several slits to the cooling roll can be freely varied. The terminology "the upper half surface of the cooling roll 7" as herein used denotes the surface portion which is positioned above a horizontal plane VW passing through the axis of said roll, i.e., the surface portioned represented by QPR.

FIGS. 7–$a$–7–$b$ are diagrammatic views illustrating other embodiments in which the angles $\alpha$ are of various sizes which are desirable according to the invention. FIGS. 7–$a$ and 7–$b$ are instance where $-45$ degrees $\leq \alpha < 0$, FIGS. 7–$c$ and 7–$d$ where $\alpha = 0$ degrees, and FIGS. 7$e$ and 7$f$ where 0 degrees $< \alpha \leq 45$ degrees. In all of these embodiments, the point of contact of the film $d$ and the cooling roll 7 is at the upper half surface of said roll. On the other hand, FIGS. 8–$a$–8–$g$ are diagrammatic views of those instances which depart from the conditions of the present invention, i.e. are modes which cannot yield satisfactory results. Although the instances shown in FIGS. 8–a and 8–b are those where 0 degrees $<\alpha \leqq 45$ degrees and those shown in FIGS. 8–c and 8–d are those where $-45$ degrees $\leqq \alpha < 0$ degrees and $\alpha = 0$ degrees, respectively, and thus satisfy the stipulations of the present invention relative to the angle $\alpha$, they are not desirable because the film $d$ and the cooling roll 7 contact each other at the part P at the lower half surface of said roll. On the other hand, in the modes illustrated in FIGS. 8–e, 8–f and 8–g, the angle $\alpha$ is in all cases greater than 45 degrees, and hence only unsatisfactory results can be obtained regardless of the position of the contact point P. As can be seen from FIG. 8–d, when the contact point P is located on the line of demarcation between the upper and lower half surfaces of the roll, this is outside the scope of the present invention. FIG. 6 illustrates a desirable embodiment of this invention which is in conformance with the aforementioned conditions (1)–(3). In this embodiment, the cooling roll 7 must be placed in a position such that its periphery extends beyond the straight line prolonged from the slit opening 3, i.e. straight line X. In other words, the angle $\alpha$ formed between the straight line X and the film $d$ which has been extruded from the slit opening and then contacts the surface of the cooling roll 7 tangentially must be greater than zero degrees. Hence, the cooling roll 7 is never placed in such a position as to be at the right of the position shown in FIGS. 1 and 3. Further, since the angle $\alpha$ must be not greater than 45 degrees, the limit of the movement of the cooling roll 7 to the left in FIG. 5 is naturally defined. Secondly, the length $l$ of the film between the point of its extrusion from the slit opening 3 and its point of contact with the cooling roll 7 must be 30–300 mm., and preferably 50–150 mm. Thus, the limits of the vertical movement of the cooling roll 7 in FIG. 6 is limited by these values. Thirdly the angle $\beta$, see FIG. 6 formed between the prolongation of the film die opening (slit 3) (straight line X) and the prolongation of the fastener member die opening (mold hole 5') (straight line Y), must be not more than 45 degrees.

The reason that in the present invention the position of contact point P, the size of the angles $\alpha$, $\beta$, $\gamma$ and $\delta$, as well as the lengths of $l$ and $l'$ were restricted is as follows:

If it is operated in such a manner that the contact point P is positioned at the lower half surface of the roll, it becomes difficult to support the film on the roll. In addition since the adhesive force is low, the fusion of the film and the fastener members tends to become unsatisfactory. If the angle $\alpha$ is greater than 45 degrees, the adhesive force of fastener members $b'$ and $b$ extruded from the mold holes 4' and 5' and the film $d$ extruded from the slit 3 become too great when the former and latter come together at the contact point P on the cooling roll 7, and as a consequence, the height of the protrusion of the male fastener member $b'$ is depressed while the mouth of the female fastener member becomes distorted so as to render the fastener easily opened. On the other hand, if the angle $\alpha$ is less than $-45$ degrees, the adhesive force between the film and the fastener members becomes so low as to render impossible their perfect fusion together. This is because as soon as the film is extruded from the die opening, it swells and the thickness thereof is increased. If the angle $\alpha$ is less than $-45°$, the face of the swelled film is apt to rub against the outer wall of the die. The rubbing portion of the film is made thinner and the cooling rate is increased in this portion, which frequently results in an insufficient adhesion to the fastener member.

When $\gamma$ is either greater than 90 degrees or less than $-90$ degrees, the extruded fastener member is susceptible to deformation. On the other hand, when the slit of the fastener member extrusion openings is not of a rounded configuration, there's a possibility that the extruded fastener members will be damaged.

When $\delta$ is greater than 45 degrees, the adhesive force between the film and the fastener members is too great, with the consequence that rather than becoming easier the fusion of the film and the fastener member becomes more difficult, and in addition with that part of the film where the fasteners are fused becoming thinner a decline in the strength of the product results.

If $l$ and $l'$ are shorter than 30 mm., not only is it difficult for the film and the fastener members to mount the cooling roll, but owing to the lack of adhesive force, the fusion of the members becomes imperfect. On the other hand, when $l$ and $l'$ are greater than 300 mm., in this case also the adhesive force becomes low and a tendency toward distortion of the fastener members takes place.

When $\beta$ is greater than 45 degrees, the fastener members are susceptible to scratches, and not only does the film become thin and its strength declines, but also the adhesive force between the film and the fastener members become so great as to result in unsatisfactory adhesion at times. Further, as the angle $\beta$ is made greater than $45°$, and angle $\gamma$ approaches $90°$. As is seen from the description given above, it is preferred that the angle $\gamma$ be far less than $90°$. Therefore, it is preferred tha the angle $\beta$ be less than $45°$.

The following example is given to illustrate the invention. This example was carried out employing an apparatus such as shown in the accompanying drawings.

Example 1

(1) Starting material for the film:

"Elrex" 112 DQ (high pressure process polyethylene produced by Rexall Drug Chemical Company, U.S.A.)

(2) Extruder for the film and operating conditions:

Cylinder diameter 65 mm.; 50 r.p.m.
Extrusion speed: 30 kg./hr.
Cylinder temperature: 180° C. (front end)–250° C. (rear end)
Screw head temperature: 240° C.
Die temperature: middle–225° C., end–250° C.
Film take-up speed: 11 m./min.

(3) Starting material for the fastener members:

"Elrex" 112 DQ admixed with 2% of blue pigment (PCM–6020, product of Dainichiseika Color Chemical Company, Japan)

(4) Extruder for the fastener members and operating conditions:

Cylinder diameter 30 mm.; 16 r.p.m.
Extrusion speed: 2 kg./hr.
Cylinder temperature 110° C. (front end)–150° C. (rear end)
Screw head temperature: 155° C.
Die temperature: 230° C.

(5) Cooling roll:

Diameter: 300 mm.
Rotating speed (peripheral speed): 11 m./min.
Cooling water temperature: 18° C.

(6) The relative positions of the die openings and the cooling roll:

$\alpha = 30$ degrees
$\gamma = 64$ degrees
$\delta = 1.6$ degrees
$l = 70$ mm.
$l' = 69.2$ mm.

Further, the point P was made to fall at the position shown in FIG. 7–f. The length of portion 6 in FIG. 6 was about 2 mm. and angle $\beta$ was 35 degrees.

(7) Coolant:

Cooling water at a pressure of 0.4 kg./cm.$^2$ was applied by means of a ¼-inch pipe at the point of union of the film and the fastener members.

(8) Product.—A material for bags comprising a colorless film 0.03 mm. thick and 900 mm. wide continuously provided in parallel in the neighborhood of its two edges with blue fastener members is obtained.

The tensile strength of the film of this bag material at that part adjoining its juncture with the fastener member, when measured perpendicularly of the fastener (of the film corresponding to 1 cm. of the fastener length, i.e., per centimeter of the film width) was 4.84 g./cm. at a temperature $20\pm1°$ C. and a humidity of $65\pm5\%$, when the average value of ten specimens was taken.

Further, when bags were made from this bag material, and the closure strength of the bag made was measured from the inside and outside of the bag, it was 45.8 g./cm. (inside) and 22.7 g./cm. (outside).

(9) Control products.—The product obtained when, of the aforesaid conditions stipulated in paragraph (6), above, $\alpha$ was made 60 degrees was so unsatisfactory as to its fastener closure that it was impossible to measure the closure strength. On the other hand, when $\alpha$ and P were made to be as in FIGS. 8–a–8–d, either the adhesion of the fastener members to the film was poor or cracks in the film occurred, and satisfactory products were thus obtained. When cooling water was not applied the tensile strength of the bag material produced was 77 g./cm., whereas that of the product of the examples was 484 g./cm. as indicated hereinbefore.

I claim:

1. A method of continuously providing fastener member in parallel on a film, which comprises forming a thin film of thermoplastic synthetic resin of optional width by extrusion thereof continuously from a die opening and concurrently extruding from separate openings by means of an extrusion means separate from that for said film, into a space at one side of said film, at least a pair of fastener members of thermoplastic synthetic resin, and thereafter bringing together the extruded film and fastener members in the neighborhood of the upper half surface of a rotating cooling roll disposed externally of said die openings while said film and fastener members are still in a fusible state, as well as effecting the forced cooling of the film and fastener members by applying a coolant to said point of union, characterized in that in this case control is effected so as to satisfy all of the five following conditions:

(a) $-45$ degrees$\leqq\alpha\leqq 45$ degrees,
(b) $-90$ degrees$<\gamma<90$ degrees,
(c) $\delta\leqq 45$ degrees,
(d) 30 mm.$\leqq l\leqq 300$ mm.,
(e) 30 mm.$\leqq l'\leqq 300$ mm., wherein $l$ is the rectilineal distance between the tip of the film die opening and the point of contact of the film with the cooling roll; $\alpha$ is the angle formed by the straight line along which said rectilineal distance $l$ is measured and a straight line extending from the film die opening; $l'$ is the rectilineal distance between the tip of the fastener members die openings and the point of union of the fastener members and the film; $\gamma$ is the angle formed by the straight line along which said rectilineal distance $l'$ is measured and a straight line extending from the fastener member die openings; and $\delta$ is the angle formed at the point of union of the film and the fastener members, i.e., an angle formed by the straight lines $l$ and $l'$.

2. The method according to claim 1 wherein said thermoplastic synthetic resin for forming the film and said thermoplastic synthetic resin for forming the fastener members are of different chemical composition.

3. The method according to claim 1 wherein said thermoplastic synthetic resin for forming the film and said thermoplastic synthetic resin for forming the fastener members are resins having different physical properties.

4. The method according to claim 1 wherein said thermoplastic synthetic resin for forming the film and said thermoplastic synthetic resin for forming the fastener members are resins having a different color.

5. The method according to claim 1 wherein said coolant is a stream of cold water.

6. The method according to claim 1 wherein said coolan is a stream of cold air.

7. A method of continuously providing fastener members in parallel on a film, which comprises forming a thin film of thermoplastic resin of optional width by extrusion thereof continuously from a die opening and concurrently extruding from separate die openings by means of an extrusion means separate from that for said film, into the space at one side of said film at least a pair of fastener members of thermoplastic synthetic resin, and thereafter bringing together the extruded film and fastener members in the neighborhood of the upper half surface of a rotating cooling roll disposed externally of said die openings while said film and fastener members are still in fusible state, as well as effecting the forced cooling of the film and fastener members by applying a coolant to the point of union, characterized in that in this case control is effected so as to satisfy the conditions that the tip of the film die opening and that of the fastener member die openings are disposed in proximate positions and a straight line extending from the film die openings is caused to point in a substantially perpendicular direction as well as all of the three following conditions:

(1) 0 degrees$<\alpha\leqq 45$ degrees.
(2) 30 mm.$\leqq l\leqq 300$ mm., and
(3) $\beta\leqq 45$ degrees, wherein $l$ is the rectilineal distance between the tip of the film die opening and the point of contact of the film with the cooling roll; $\alpha$ is the angle formed by the straight line along which said rectilineal distance is measured and a straight line extending from the film die opening; and $\beta$ is the angle formed by the straight line extending from the film die opening and a straight line extending from the fastener member die openings.

References Cited

UNITED STATES PATENTS

| 2,932,855 | 4/1960 | Bartlett | 264—171 |
| 3,034,941 | 5/1962 | Hessenthaler et al. | 156—167 X |
| 3,088,495 | 5/1963 | Svec | 138—128 |
| 3,338,284 | 8/1967 | Ausnit | 150—3 |
| 3,338,285 | 8/1967 | Jaster | 150—3 |

FOREIGN PATENTS 698,447 11/1964 Canada.

HAROLD ANSHER, Primary Examiner

T. R. SAVOIE, Assistant Examiner

U.S. Cl. X.R.

156—311, 498, 500; 264—167, 177